US012750755B2

(12) United States Patent
Geng et al.

(10) Patent No.: US 12,750,755 B2
(45) Date of Patent: Sep. 29, 2026

(54) MOBILITY MANAGEMENT METHOD AND COMMUNICATION APPARATUS

(71) Applicant: HUAWEI TECHNOLOGIES CO., LTD., Shenzhen (CN)

(72) Inventors: Tingting Geng, Shenzhen (CN); Wuyang Zheng, Shenzhen (CN); Jun Chen, Shanghai (CN); Henrik Olofsson, Kista (SE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 297 days.

(21) Appl. No.: 18/434,174

(22) Filed: Feb. 6, 2024

(65) Prior Publication Data

US 2024/0179605 A1 May 30, 2024

Related U.S. Application Data

(63) Continuation of application No. PCT/CN2022/110420, filed on Aug. 5, 2022.

(30) Foreign Application Priority Data

Aug. 6, 2021 (CN) ......................... 202110900350.3

(51) Int. Cl.
*H04W 36/36* (2009.01)
*H04W 36/30* (2009.01)
*H04W 36/32* (2009.01)

(52) U.S. Cl.
CPC ......... *H04W 36/362* (2023.05); *H04W 36/30* (2013.01); *H04W 36/324* (2023.05)

(58) Field of Classification Search
CPC . H04W 36/362; H04W 36/30; H04W 36/324; H04W 36/0079; H04W 36/00;
(Continued)

(56) References Cited

U.S. PATENT DOCUMENTS 12,273,948 B2 * 4/2025 Chang .................. H04W 76/18
12,289,646 B2 * 4/2025 Parichehrehteroujeni .................. H04W 36/0058
(Continued)

FOREIGN PATENT DOCUMENTS

CN 113056934 A 6/2021
EP 4351266 A1 4/2024
(Continued)

OTHER PUBLICATIONS

Huawei, "(TP for SON BLCR for 38.300) Mobility Enhancement Optimization," 3GPP TSG-RAN WG3 Meeting #113-e, R3-213412, E-meeting, Aug. 16-26, 2021, 8 pages.
(Continued)

*Primary Examiner* — Brian T O Connor
(74) *Attorney, Agent, or Firm* — Fish & Richardson P.C.

(57) ABSTRACT

The present disclosure relates to mobility management methods and apparatuses. In an example method, a first network device sends conditional handover configuration information of a terminal device to a second network device. After obtaining a mobility report, the first network device sends a first message to the second network device to request the conditional handover configuration information of the terminal device. The first network device receives a response message of the first message from the second network device.

20 Claims, 3 Drawing Sheets

(58) Field of Classification Search
CPC ... H04W 36/00833; H04W 36/008375; H04W 36/08; H04W 36/36; H04W 76/19; H04W 76/10; H04W 24/02; H04W 36/00837; H04W 36/0072; H04W 36/0077; H04W 36/00838; H04W 76/27; H04W 24/10; H04W 36/008357; H04W 36/305
See application file for complete search history.

(56) References Cited

U.S. PATENT DOCUMENTS

| | | | | |
|---|---|---|---|---|
| 12,369,087 | B2 * | 7/2025 | Shrestha | H04W 36/00838 |
| 12,382,352 | B2 * | 8/2025 | Van Der Velde | H04W 36/00837 |
| 12,495,348 | B2 * | 12/2025 | Fujishiro | H04W 36/0064 |
| 12,520,210 | B2 * | 1/2026 | Paladugu | H04W 36/00837 |
| 12,574,974 | B2 * | 3/2026 | Seidel | H04W 74/006 |
| 2021/0051550 | A1 | 2/2021 | Latheef et al. | |
| 2021/0274404 | A1 * | 9/2021 | Koziol | H04W 36/0094 |
| 2022/0141735 | A1 * | 5/2022 | Liu | H04W 36/0079 370/331 |
| 2022/0225190 | A1 * | 7/2022 | Gummadi | H04W 36/0058 |
| 2022/0279401 | A1 * | 9/2022 | Wallentin | H04W 76/30 |
| 2022/0377630 | A1 * | 11/2022 | Wu | H04W 76/19 |
| 2023/0022967 | A1 * | 1/2023 | Chang | H04W 36/0079 |
| 2023/0040285 | A1 * | 2/2023 | Parichehrehteroujeni | H04W 36/0079 |
| 2023/0217329 | A1 * | 7/2023 | Wallentin | H04W 36/00837 370/331 |
| 2023/0422135 | A1 * | 12/2023 | Wu | H04W 36/0058 |
| 2024/0147338 | A1 * | 5/2024 | Wen | H04W 36/362 |
| 2024/0224150 | A1 * | 7/2024 | Chang | H04W 36/0079 |
| 2024/0373299 | A1 * | 11/2024 | Teyeb | H04W 36/0058 |
| 2024/0381214 | A1 * | 11/2024 | Kim | H04W 36/0005 |

FOREIGN PATENT DOCUMENTS

| | | | |
|---|---|---|---|
| TW | 202033049 | A | 9/2020 |
| WO | 2021092916 | A1 | 5/2021 |

OTHER PUBLICATIONS

Samsung, "Discussion on SON enhancements for CHO," 3GPP TSG-RAN3 Meeting #112-e, R3-212404, May 17-27, 2021, 6 pages.

Extended European Search Report in European Appln. No. 22852323.9, mailed on Oct. 30, 2024, 14 pages.

International Search Report and Written Opinion in International Appln. No. PCT/CN2022/110420, mailed on Nov. 2, 2022, 18 pages (with English translation).

* cited by examiner

MOBILITY MANAGEMENT METHOD AND COMMUNICATION APPARATUS

CROSS-REFERENCE TO RELATED APPLICATIONS

This application is a continuation of International Application No. PCT/CN2022/110420, filed on Aug. 5, 2022, which claims priority to Chinese Patent Application No. 202110900350.3, filed on Aug. 6, 2021. The disclosures of the aforementioned applications are hereby incorporated by reference in their entireties.

TECHNICAL FIELD

This application relates to the field of communication technologies, and in particular, to a mobility management method and a communication apparatus.

BACKGROUND

Mobility scenarios in a wireless communication system include a handover scenario. When a connection failure occurs in a handover process, a terminal device may send a radio link failure report to a network side, so that the network side obtains a cause for the connection failure. The radio link failure report may be further used for mobility management. One type of the handover scenario is conditional handover. In this conditional handover scenario, even if the terminal device successfully completes conditional handover, a radio link failure still occurs quickly after the conditional handover, or a potential problem of successful handover exists. How to enable, in such a scenario, a network device to obtain a mobility parameter that needs to be optimized is an urgent problem to be resolved.

SUMMARY

Embodiments of this application provides a mobility management method and an apparatus, so that a network device can obtain a mobility parameter that needs to be optimized. Further, in this way, proper mobility management can be performed, mobility robustness can be improved, and user experience can be improved.

Embodiments of this application may be specifically implemented by using the following technical solutions.

According to a first aspect, a mobility management method is provided. It may be understood that the method in the first aspect may be performed by a first apparatus, and the first apparatus may be a first network device or a communication apparatus that can support a first network device in implementing a function needed by the method, for example, a chip, a circuit, or a chip system. For example, the first network device implements the method. The method may include:

The first network device sends conditional handover configuration information of a terminal device to a second network device. After obtaining a mobility report, the first network device requests the conditional handover configuration information of the terminal device from the second network device by using a first message. The first network device receives a corresponding response message from the second network device.

By using the method according to this embodiment of this application, a network device can obtain a mobility parameter that needs to be optimized. Further, in this way, proper mobility management can be performed, mobility robustness can be improved, and user experience can be improved.

With reference to the first aspect, in some possible implementations, before the first network device sends the conditional handover configuration information of the terminal device to the second network device, the first network device receives a handover success message from the second network device, where the handover success message indicates that the terminal device successfully completes conditional handover, and accesses the second network device.

With reference to the first aspect, in some possible implementations, if the second network device stores the conditional handover configuration information of the terminal device, or the second network device may obtain the conditional handover configuration information of the terminal device in another manner, the first network device may receive the conditional handover configuration information from the second network device. Further, the received conditional handover configuration information may be used for optimizing the mobility parameter. If the second network device does not store or cannot obtain the conditional handover configuration information of the terminal device, the first network device receives, from the second network device, information indicating a conditional handover configuration information request failure. Optionally, the first network device may discard the received mobility report. This saves storage space of the terminal device.

According to a second aspect, a mobility management method is further provided. The method in the second aspect may be performed by a second apparatus, and the second apparatus may be a second network device or a communication apparatus that can support a second network device in implementing a function needed by the method, for example, a chip, a circuit, or a chip system. For example, the second network device implements the method. The method may include:

The second network device receives conditional handover configuration information of a terminal device from a first network device. The second network device receives a first message from the first network device. The first message requests the conditional handover configuration information of the terminal device. The second network device sends a response message of the first message to the first network device.

By using the method according to this embodiment of this application, a network device can obtain a mobility parameter that needs to be optimized. Further, in this way, proper mobility management can be performed, mobility robustness can be improved, and user experience can be improved.

With reference to the second aspect, in some possible implementations, before the second network device receives the conditional handover configuration information that is of the terminal device and that is sent by the first network device, the second network device sends a handover success message to the first network device, where the handover success message indicates that the terminal device successfully completes conditional handover, and accesses the second network device.

With reference to the second aspect, in some possible implementations, if the second network device stores the conditional handover configuration information of the terminal device, or the second network device may obtain the conditional handover configuration information of the terminal device in another manner, the second network device may send the conditional handover configuration information to the first network device. Further, the first network device may use the received conditional handover configuration information to optimize the mobility parameter. If the second network device does not store or cannot obtain the conditional handover configuration information of the terminal device, the second network device sends, to the first network device, information indicating a conditional handover configuration information request failure. Optionally, the first network device may discard a received mobility report. This saves storage space of the terminal device.

With reference to the first aspect or the second aspect, in some possible implementations, the conditional handover configuration information includes conditional handover information that is of one or more candidate cells and that is configured by the first network device for the terminal device. Alternatively, the conditional handover configuration information includes mobility information, where the mobility information indicates a mobility identifier or index that corresponds to a conditional handover mobility parameter of a cell and that is configured for the terminal device. In this way, indication of the CHO configuration information can be simplified, and efficiency can be improved. It may be understood that the conditional handover configuration information may alternatively be not limited to the method in the first aspect or the second aspect.

With reference to the first aspect or the second aspect, in some possible implementations, the first message carries identification information of the terminal device, or identification information of the terminal device and conditional handover-related time information. In this way, a correct terminal device may be determined by a target network device based on the information, and corresponding CHO configuration information may be further determined. For example, the conditional handover-related time information indicates time information when the terminal device completes the conditional handover, and/or time information that is of at least one message related to executing the conditional handover and that is between the first network device and the second network device.

According to a third aspect, a mobility management method is further provided. The method in the third aspect may be performed by a third apparatus, and the third apparatus may be a third network device or a communication apparatus that can support a third network device in implementing a function needed by the method, for example, a chip, a circuit, or a chip system. The third network device may be a source network device or another network device. For example, the third network device implements the method. The method may include: receiving a mobility report from a terminal device, identifying, based on the received mobility report, a target network device to which the terminal device successfully completes conditional handover, and forcibly sending the received mobility report to the target network device.

According to a fourth aspect, a mobility management method is further provided. The method in the fourth aspect may be performed by a third apparatus, and the third apparatus may be a third network device or a communication apparatus that can support a third network device in implementing a function needed by the method, for example, a chip, a circuit, or a chip system. The third network device may be a source network device or another network device. For example, the third network device implements the method. The method may include: receiving a mobility report from a terminal device, and sending the mobility report to a conditional handover target network device that has a 2nd connection failure and whose connection failure type is a radio link failure.

With reference to the method in the third aspect or the fourth aspect, in some possible implementations, the method further includes: receiving, from the terminal device, the mobility report and information indicating a forward cell, where the mobility report is in an encoding format of a first system or standard, and when the mobility report is received, a cell in which the terminal device is located belongs to a second system or standard. Optionally, information indicating a priority sequence of forward cells may be further received from the terminal device. Optionally, the mobility report is carried in a message in a form of a container. The information about the forward cell and the indication information of the priority sequence of the forward cells may be outside the container in the foregoing message. It may be understood that the foregoing solution of indicating the information about the forward cell and/or indicating the information about the priority sequence of the forward cells is not limited to the method applicable to the third aspect or the fourth aspect.

In the method in the third aspect or the fourth aspect, a mechanism for forwarding a mobility report between a receiving network device and a target network device is defined, so that the mobility report needs to be forwarded by the receiving network device to the conditional handover target network device. In this way, the conditional handover target network device may have an opportunity to send conditional handover configuration information to the source network device, so that the source network device may obtain corresponding conditional handover configuration information. In this way, proper mobility management is performed, mobility robustness is improved, and user experience is improved.

According to a fifth aspect, a mobility management method is further provided. The method provides a mechanism for storing conditional handover configuration information. The method in the fifth aspect may be performed by a first apparatus, and the first apparatus may be a first network device or a communication apparatus that can support a first network device in implementing a function needed by the method, for example, a chip, a circuit, or a chip system. For example, the first network device implements the method. The method may include: determining that no handover success message is received from a second network device, or determining that indication information that is from the second network device and that indicates that a mobility report is stored on a terminal device side is received; and storing condition handover configuration information of the terminal device.

According to a sixth aspect, a mobility management method is further provided. The method provides a mechanism for storing conditional handover configuration information. The method in the sixth aspect may be performed by a first apparatus, and the first apparatus may be a first network device or a communication apparatus that can support a first network device in implementing a function needed by the method, for example, a chip, a circuit, or a chip system. For example, the first network device implements the method. The method may include: receiving indication information from a second network device, where the indication information indicates to store conditional handover configuration information of a terminal device; and if the indication information is sent when the second network device detects a connection failure between the terminal device and a conditional handover target cell within running time of a first timer, storing the conditional handover configuration information of the terminal device.

According to a seventh aspect, a mobility management method is further provided. The method provides a mechanism for storing conditional handover configuration information. The method in the seventh aspect may be performed by a first apparatus, and the first apparatus may be a first network device or a communication apparatus that can support a first network device in implementing a function needed by the method, for example, a chip, a circuit, or a chip system. For example, the first network device implements the method. The method may include: determining a conditional handover failure of a terminal device, and storing conditional handover configuration information of the terminal device. Optionally, if a handover success message or a terminal device context release message is not received, the conditional handover failure may be determined.

According to an eighth aspect, a mobility management method is further provided. The method provides a mechanism for storing conditional handover configuration information. The method in the eighth aspect may be performed by a first apparatus, and the first apparatus may be a first network device or a communication apparatus that can support a first network device in implementing a function needed by the method, for example, a chip, a circuit, or a chip system. For example, the first network device implements the method. The method may include: after a handover success message from a second network device is received, starting a second timer; and if the second timer expires and no terminal device context release message from the second network device is received, storing conditional handover configuration information of a terminal device. Alternatively, within running time of the second timer, if indication information that is from the second network device and that indicates that a mobility report is stored on the terminal device side is received, or indication information that is from the second network device and that indicates a connection failure between the terminal device and the second network device is received, the conditional handover configuration information of the terminal device is stored. Optionally, within the running time of the second timer, if the indication information that is from the second network device and that indicates that the mobility report is stored on the terminal device side is received, or the indication information that is from the second network device and that indicates the connection failure between the terminal device and the second network device is received, the second timer may be stopped.

According to a ninth aspect, a mobility management method is further provided. The method provides a mechanism for storing conditional handover configuration information. The method in the ninth aspect may be performed by a first apparatus, and the first apparatus may be a first network device or a communication apparatus that can support a first network device in implementing a function needed by the method, for example, a chip, a circuit, or a chip system. For example, the first network device implements the method. The method may include: after a terminal device context release message from a second network device is received, starting a third timer; and within running time of the third timer, if indication information that is from the second network device and that indicates that a mobility report is stored on a terminal device side is received, or indication information that is from the second network device and that indicates a connection failure between the terminal device and the second network device is received, storing conditional handover configuration information of the terminal device. Optionally, within the running time of the third timer, if the indication information that is from the second network device and that indicates that the mobility report is stored on the terminal device side is received, or the indication information that is from the second network device and that indicates the connection failure between the terminal device and the second network device is received, the third timer may be stopped.

According to a tenth aspect, a mobility management method is further provided. The method in the tenth aspect may be performed by a second apparatus, and the second apparatus may be a second network device or a communication apparatus that can support a second network device in implementing a function needed by the method, for example, a chip, a circuit, or a chip system. For example, the second network device implements the method. The method may include: starting a first timer after a terminal device successfully completes conditional handover. If it is determined that a connection failure between the terminal device and a serving cell (that is, a conditional handover target cell) is detected within running time of the first timer, information indicating a first network device to store conditional handover configuration information is sent to the first network device. Alternatively, if it is determined that the connection failure between the terminal device and the serving cell (that is, the conditional handover target cell) is detected within running time of the first timer, a handover success message or a terminal device context release message is not sent to the first network device. Optionally, if the first timer expires, and no connection failure between the terminal device and the serving cell (that is, the conditional handover target cell) is detected, the handover success message or the terminal device context release message may be sent to the first network device. Optionally, if the failure between the terminal device and the serving cell is detected within the running time of the first timer, the second network device stops the first timer.

According to an eleventh aspect, a mobility management method is further provided. The method in the eleventh aspect may be performed by a communication apparatus, and the communication apparatus may be a terminal device or an apparatus that can support a terminal device in implementing a function needed by the method, for example, a chip, a circuit, or a chip system. For example, the terminal device implements the method. The method may include: The terminal device sends, to a receiving network device, a mobility report and information indicating forward cell information, where the mobility report is in an encoding format of a first system or standard, and when the mobility report is sent, a cell in which the terminal device is located belongs to a second system or standard. The method can assist the receiving network device in better forwarding the mobility report. Optionally, the terminal device may further indicate, to the receiving network device, information about a priority sequence of forward cells. Optionally, the mobility report may be carried in a message in a form of a container, and sent to the receiving network device. The information about the forward cell and the indication information of the priority sequence of the forward cells may be outside the container in the foregoing message.

According to a twelfth aspect, a communication apparatus is provided. The communication apparatus has a function of implementing a behavior or a step in any method in the first aspect to the tenth aspect. The communication apparatus may be a network device or a component (for example, a chip or a circuit) that may be used in a network device. The function may be implemented by hardware, or may be implemented by hardware executing corresponding software. The hardware or the software includes one or more modules corresponding to the foregoing function.

According to a thirteenth aspect, a communication apparatus is provided. The communication apparatus has a function of implementing a behavior or a step in the method in the eleventh aspect. The communication apparatus may be a terminal device or a component (for example, a chip or a circuit) that may be used in a terminal device. The function may be implemented by hardware, or may be implemented by hardware executing corresponding software. The hardware or the software includes one or more modules corresponding to the foregoing function.

According to a fourteenth aspect, a communication apparatus is provided. The communication apparatus may be a communication apparatus that implements any method in the first aspect to the eleventh aspect. The communication apparatus includes a processor and a memory. The memory is configured to store a computer program, instructions, or data. The processor is coupled to the memory. When the processor reads the computer program, the instructions, or the data, the communication apparatus is enabled to perform the method in any aspect. Optionally, the communication apparatus may further include a communication interface.

For example, the communication interface may be a transceiver in the communication apparatus. The transceiver may be used by the communication apparatus to communicate with another device.

According to a fifteenth aspect, an embodiment of this application provides a chip system. The chip system includes a processor, configured to implement any method in the first aspect to the eleventh aspect. In a possible design, the chip system further includes a memory, configured to store program instructions and/or data. The chip system may include a chip, or may include a chip and another discrete device.

According to a sixteenth aspect, an embodiment of this application provides a communication system. The system includes at least one of a first network device, a second network device, a third network device, and a terminal device.

According to a seventeenth aspect, a computer program product is provided. The computer program product includes computer program code, and when the computer program code is run, any method in the foregoing aspects is performed.

According to an eighteenth aspect, this application provides a computer-readable storage medium. The computer-readable storage medium stores a computer program, and when the computer program is run, any method in the foregoing aspects is implemented.

DESCRIPTION OF EMBODIMENTS

Figure 1:
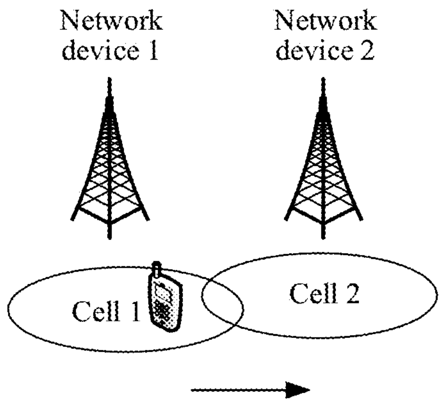
FIG. 1 is an application scenario according to an embodiment of this application.

In embodiments of this application, "at least one" means one or more, and "a plurality of" means two or more. "And/or" describes an association relationship between associated objects, and represents that three relationships may exist. For example, A and/or B may indicate the following cases: Only A exists, both A and B exist, and only B exists, where A and B may be singular or plural. The character "/" generally indicates an "or" relationship between the associated objects. "At least one of the following items (pieces)" or a similar expression thereof indicates any combination of these items, including a single item (piece) or any combination of a plurality of items (pieces). For example, at least one item (piece) of a, b, or c may represent a, b, c, a and b, a and c, b and c, or a, b, and c, and each of a, b, c may be an element, or may be a set including one or more elements.

In embodiments of this application, "for example", "in some embodiments", "in another embodiment", "in an implementation", or the like is used as an example, an illustration, or a description. Any embodiment or design scheme described as an "example" in this application should not be explained as being more preferred or having more advantages than another embodiment or design scheme. Exactly, the term "example" is used to present a concept in a specific manner.

In embodiments of this application, communication and transmission may be interchangeably used sometimes. It should be noted that expressed meanings are consistent when differences are not emphasized. For example, transmission may include sending and/or receiving, and may be a noun or a verb.

It should be noted that, in embodiments of this application, terms such as "first" and "second" are only used for a purpose of distinction in description, and cannot be understood as an indication or implication of relative importance or an indication or implication of a sequence. In embodiments of this application, "equal to" may be used together with "greater than", and is applicable to a technical solution used in a case of "greater than", or may be used together with "less than", and is applicable to a technical solution used in a case of "less than". It should be noted that, when "equal to" and "greater than" are used together, "equal to" is not used together with "less than", and when "equal to" and "less than" are used together, "equal to" is not used together with "greater than".

The following describes some terms in embodiments of this application.

1. Terminal Device:

In embodiments of this application, the terminal device is a device with a wireless transceiver function, and may be referred to as a terminal, user equipment (UE), a mobile station (MS), a mobile terminal (MT), an access terminal device, a vehicle-mounted terminal device, an industrial control terminal device, a UE unit, a UE station, a remote station, a remote terminal device, a mobile device, a UE terminal device, a wireless communication device, a UE agent, a UE apparatus, or the like. The terminal device may be fixed or mobile. It should be noted that the terminal device may support at least one wireless communication technology, for example, LTE, NR, or wideband code division multiple access (WCDMA). For example, the terminal device may be a mobile phone, a tablet computer (pad), a desktop computer, a notebook computer, an all-in-one computer, a vehicle-mounted terminal, a virtual reality (virtual reality, VR) terminal device, an augmented reality (AR) terminal device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a wearable device, a terminal device in a future mobile communication network or a terminal device in a future evolved public land mobile network (PLMN), or the like. In some embodiments of this application, the terminal may alternatively be an apparatus with a transceiver function, for example, a chip system. The chip system may include a chip, and may further include another discrete device.

2. Network Device:

In embodiments of this application, the network device is a device that provides a wireless communication function for the terminal device, and may also be referred to as an access network device, a radio access network (RAN) device, or the like. For example, the network device includes but is not limited to a next generation base station (generation NodeB, gNB) in a 5th-generation (5G) mobile communication system, an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), a transmitting and receiving point (TRP), a transmission point (TP), a mobile switching center, or the like. The network device may alternatively be a radio controller, a central unit (CU), and/or a distributed unit (DU) in a cloud radio access network (C-RAN) scenario. Alternatively, the network device may be a relay station, an access point, a vehicle-mounted device, a terminal device, a wearable device, a network device in future mobile communication or a network device in a future evolved PLMN, and the like. In some embodiments, the network device may alternatively be an apparatus that provides a wireless communication function for the terminal device, for example, a chip system. For example, the chip system may include a chip, and may further include another discrete device.

The CU and the DU may be physically separated or deployed together. A plurality of DUs may share one CU. One DU may alternatively be connected to a plurality of CUs. The CU and the DU may be connected through an interface, for example, an F1 interface. The CU and the DU may be obtained through division based on protocol layers of a wireless network. For example, a possible division manner is that the CU is configured to perform functions of a radio resource control (RRC) layer, a service data adaptation protocol (SDAP) layer, and a packet data convergence protocol (PDCP) layer, and the DU is configured to perform functions of a radio link control (RLC) layer, a media access control (MAC) layer, a physical layer, and the like. It may be understood that, division into processing functions of the CU and the DU based on the protocol layers is merely an example, and there may be another division manner. For example, the CU or the DU may have functions of more protocol layers through division. For example, the CU or the DU may alternatively have some processing functions of the protocol layers through division. In a design, some functions of the RLC layer and functions of a protocol layer above the RLC layer are set in the CU, and remaining functions of the RLC layer and functions of a protocol layer below the RLC layer are set in the DU. In another design, functions of the CU or the DU may alternatively be obtained through division based on a service type or another system requirement. For example, division is performed based on a latency, a function whose processing time needs to satisfy a latency requirement is set in the DU, and a function whose processing time does not need to satisfy the latency requirement is set in the CU. The forgoing network architecture may be applied to a 5G communication system, and may alternatively share one or more components or resources with an LTE system. In another design, the CU may alternatively have one or more functions of a core network. One or more CUs may be disposed in a centralized manner or in a separate manner. For example, the CU may be disposed on a network side for ease of centralized management. The DU may have a plurality of radio frequency functions, or the radio frequency functions may be set remotely.

The functions of the CU may be implemented by one entity, or may be implemented by different entities. For example, the functions of the CU may be further divided. For example, a control plane (CP) and a user plane (UP), that is, a control plane of the CU (CU-CP) and a user plane of the CU (CU-UP), are separated. For example, the CU-CP and the CU-UP may be implemented by different functional entities. The CU-CP and the CU-UP may be coupled to the DU to jointly implement a function of the access network device.

The terminal device may communicate with access network devices of different technologies. For example, the terminal device may communicate with an access network device supporting long term evolution (LTE), may communicate with an access network device supporting 5G, or may communicate with both the access network device supporting LTE and the access network device supporting 5G simultaneously. This is not limited in embodiments of this application.

3. Core Network Device

The core network device is a device on a core network (CN) that provides service support for a terminal. Currently, some examples of the core network device are as follows: an access and mobility management function (AMF) entity, a session management function (SMF) entity, and a user plane function (UPF) entity, which are not listed one by one herein. The AMF entity may be responsible for access management and mobility management of the terminal. The SMF entity may be responsible for session management, for example, user session setup. The UPF entity may be a user plane function entity, and is mainly responsible for connection to an external network. It should be noted that an entity in this application may also be referred to as a network element or a function entity. For example, the AMF entity may also be referred to as an AMF network element or an AMF function entity. For another example, the SMF entity may also be referred to as an SMF network element or an SMF function entity.

4. Handover

Handover scenarios involved in embodiments of this application can be classified into common handover (also referred to as conventional handover), conditional handover (CHO), and dual active protocol stack (DAPS) handover.

The common handover is a process in which the terminal device receives configuration delivered by a source network device, completes reconfiguration on a target network device, accesses a target base station, and disconnects from the source network device.

The DAPS handover means that the terminal device still maintains connection to the source network device after receiving a handover command, and attempts to establish connection to the target network device. Therefore, it may be considered that, in the DAPS handover scenario, the terminal device establishes connection to the source network device and the target network device separately until the target network device indicates the terminal device to disconnect from the source network device. From a perspective of procedures, there may be Xn-based handover and NG-based handover. In the Xn-based handover, the source network device and the target network device exchange a handover request. In the NG-based handover, the source network device sends the handover request to the AMF, and then the AMF sends a handover command to the target network device.

In the CHO, the source network device sends CHO configuration information to the terminal device. After receiving the CHO configuration information, the terminal device determines, based on the CHO configuration information, whether each CHO candidate cell satisfies a handover triggering condition, uses a CHO candidate cell that satisfies the handover triggering condition as a target cell, and then performs a random access procedure with the determined target cell. When the random access is successfully completed, the terminal device sends, to a network device (namely, the target network device) to which the target cell belongs, an RRC message (for example, an RRC reconfiguration complete message), to notify the target network device that the conditional handover is completed.

5. Radio Link Failure (RLF) Report

In a communication network, an MRO (mobility robustness optimization) mechanism is introduced. In an existing MRO mechanism, a terminal is introduced to record a parameter in a mobility process, record a corresponding mobility report, and send the report to the network device, so that the network device can better adjust a mobility-related parameter. The mobility report includes at least one of a successful mobility report (including various successful mobility reports, such as any one or more of a successful common handover report, a successful CHO report, or another success report), a failure report (including any one or more of the RLF report or another failure report), a random access report, a connection failure report, and the like.

An example in which an RLF occurs in the target cell after the terminal device completes the handover is used. A procedure in which the terminal device records the RLF report, sends the RLF report, and forwards the RLF report between network devices may be, for example, as follows.

The terminal device detects the RLF, records the RLF report, and sends the RLF report to an accessed network device (for example, a third gNB). The third gNB sends the RLF report to a network device (for example, a target gNB) corresponding to the cell in which the radio link failure occurs, and the target gNB determines whether to forward the RLF report to a network device (for example, a source gNB) corresponding to a source cell. If the RLF report needs to be forwarded to the source gNB, the target gNB sends a handover report (HO Report) message to the source gNB, where the HO report message may carry at least one of the RLF report and mobility information of the source gNB. Optionally, the mobility information may be sent by the source gNB to the target gNB in a handover request message.

For example, the RLF report may include at least one of the following information.

(1) Failed primary cell identifier (failedPCellId): information about a primary cell in which the terminal device detects an RLF or a timer expiration is detected; or information about a target primary cell of a HOF. The timer may be, for example, a timer started after the terminal device sends a measurement report. If the terminal device has not received a handover command after the timer expires, it may be considered that a connection failure occurs. The timer may be, for example, T312.

Optionally, connection failure information may alternatively not include the failed primary cell identifier (failedPCellId), but include a failed cell identifier (failedCellId). The failed cell identifier is information about the cell in which the link failure or the timer expiration is detected by the terminal device, or information about a target cell to which handover fails. This is not limited in embodiments of this application.

(2) Connection failure type (connectionFailureType):

For example, the connection failure type may be an RLF, a HOF, or a timer (for example, T312) expiration, or a contention failure (for example, a listen before talk (listen before talk, LBT) failure). The connection failure type may also be referred to as a failure type for short.

(3) Previous primary cell identifier (previousPCellId): information about a previous primary cell in which the terminal device receives a handover command at a previous time.

Optionally, the connection failure information may alternatively not include the previous primary cell identifier (previousPcellId), but include a previous cell identifier (previousCellId). The previous cell identifier is information about a previous cell in which the terminal device receives the handover command at a previous time. This is not limited in embodiments of this application.

(4) Reestablishment cell identifier (reestablishmentCellId): information about a cell in which reestablishment is attempted after the connection failure.

(5) Time connection failure (timeConnFailure): duration from a last (or latest) time of receiving the handover command (or a reconfiguration message) to the connection failure.

(6) Time since failure (timeSinceFailure): duration that starts to be recorded since the connection failure. Generally, the time since failure is duration from the connection failure to reporting the failure report.

(7) Connection failure-cause (rlf-Cause): The cause for the connection failure may include a HOF, an RLF, a reconfiguration synchronization failure, a handover failure from NR to another system, an integrity check failure, or an RRC connection reconfiguration failure.

(8) Location information (locationInfo): information about a location at which the connection failure occurs in the terminal device.

(9) Random access information (ra-InformationCommon): information about random access performed by the terminal device in the target primary cell.

(10) Measurement result: a measurement result of a cell and/or a beam. The measurement result may include a measurement result of the serving cell and/or a neighboring cell.

(11) Time information (timeCHOcfgExe) from time when CHO configuration is received to time when CHO execution is triggered.

(12) CHO cell information: indicates information about a cell to which UE successfully completes CHO.

(13) Handover type: CHO.

(14) Reconnected cell information (reconnectCellId): indicates information about a cell with which the terminal device returns to a connected state after the connection failure or a reestablishment failure. It may be understood that the terminal device may not record the information if the reestablishment succeeds.

In a CHO handover procedure, at least one connection failure may occur, or in other words, a connection failure nearly occurs. In this case, the terminal device may record a mobility report. In addition, in short time after the CHO is completed, at least one connection failure may occur quickly, or a connection failure may nearly occur. In this case, the terminal device may also record the mobility report. The mobility reports recorded in the foregoing cases may be referred to as CHO-related mobility reports. After receiving the CHO-related mobility report, the source network device may determine whether to optimize a corresponding mobility parameter based on corresponding CHO configuration information (namely, configuration information for the source network device to configure the terminal device to perform the CHO).

FIG. 1 is an application scenario according to an embodiment of this application. A terminal device moves from a coverage area of a network device 1 to a coverage area of a network device 2. To maintain communication continuity, the terminal device is handed over from a cell 1 of the network device 1 to a cell 2 of the network device 2. The network device 1 may be referred to as a source network device, and the cell 1 may be referred to as a source cell. Correspondingly, the network device 2 may be referred to as a target network device, and the cell 2 may be referred to as a target cell. The application scenario is applicable to various wireless communication systems, for example, a long term evolution (LTE) system, an LTE frequency division duplex (FDD) system, LTE time division duplex (TDD) system, a worldwide interoperability for microwave access (WiMAX) communication system, a 5G system or new radio (NR) system, or a future evolved system.

It should be understood that, in embodiments of this application, the terminal device and/or a network device may perform some or all of steps in embodiments of this application. These steps or operations are merely examples. In embodiments of this application, other operations or variants of operations may be further performed. In addition, the steps may be performed in different sequences presented in embodiments of this application, and not all operations in embodiments of this application may need to be performed.

Figure 2:
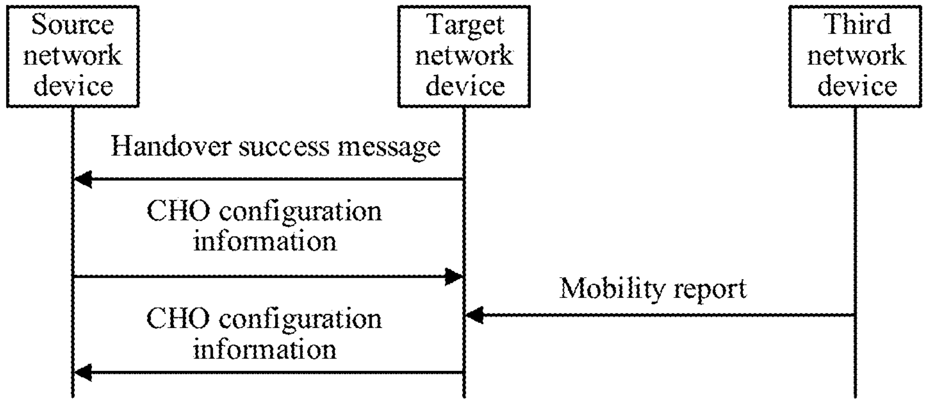
FIG. 2 is a schematic flowchart in which a source network device obtains conditional handover configuration information according to an embodiment of this application.

In a CHO scenario, a possible solution for how a source network device obtains CHO configuration information corresponding to a CHO-related mobility report is as follows. FIG. 2 is used as an example. After receiving a handover success (HO SUCCESS) message of a target network device (referred to as a CHO network device) that a terminal device successfully accesses through CHO, the source network device sends stored CHO configuration information to the CHO target network device, and the CHO target network device stores the received CHO configuration information. When the CHO target network device receives a mobility report (for example, an RLF report) from the terminal device or another network device (for example, a third network device), the CHO target network device sends the stored CHO configuration information to the source network device. For example, the CHO configuration information may be carried in a HO report sent by the CHO target network device to the source network device. A manner in which the CHO target network device sends the CHO configuration information to the source network device is not limited in this embodiment of this application.

Figure 3:
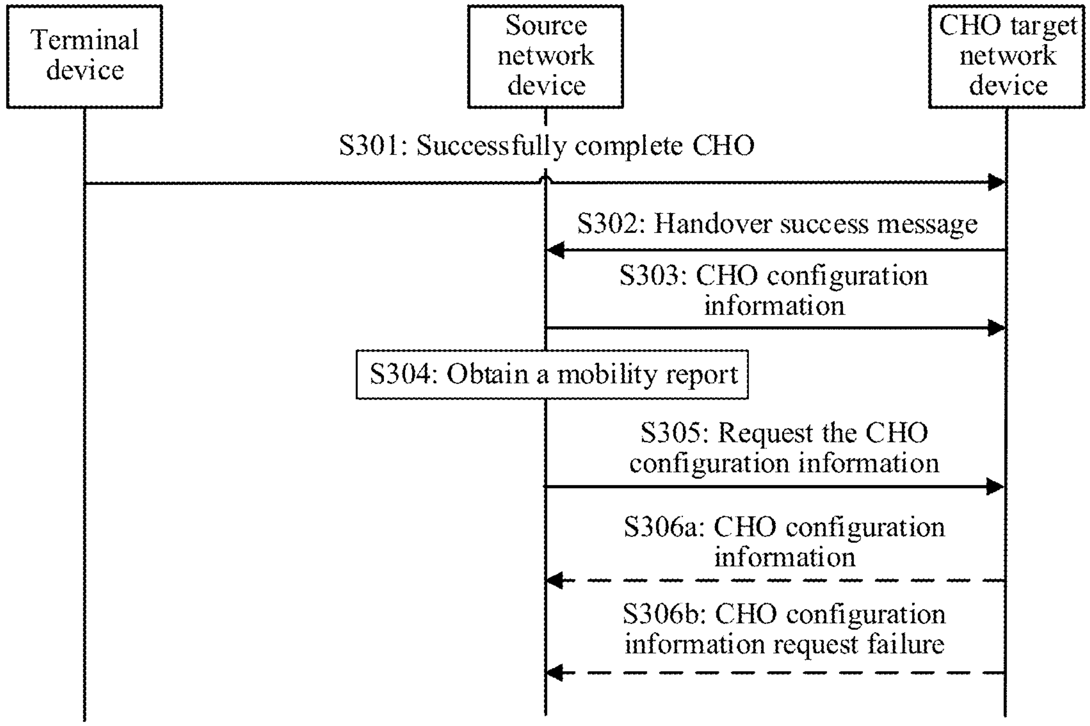
FIG. 3 is a schematic flowchart of an example of a mobility management method according to an embodiment of this application.

It may be understood that, in some cases, the CHO target network device may not receive the CHO-related mobility report of the terminal device. After detecting a connection failure, the terminal may perform CHO reestablishment once. Therefore, there may be a scenario in which after the terminal device detects a 1st connection failure (whose failure type is an RLF) in a source cell, or a 1st connection failure (whose failure type is a HOF) occurs between the terminal device and a 1st CHO target cell, the terminal device successfully performs the CHO reestablishment, or a 2nd connection failure (whose failure type is an RLF) occurs soon after the terminal device successfully performs the CHO reestablishment. In the foregoing scenarios, a network device that receives the RLF report may send the mobility report (for example, the RLF report) to the source network device instead of sending the mobility report to the CHO target network device. As shown in FIG. 3, a mobility management method is provided, and the method may include the following steps.

S301: A terminal device successfully completes CHO, and accesses a CHO target cell.

A manner in which "a terminal device successfully completes CHO, and accesses a CHO target cell" may be: The terminal device successfully completes the CHO, and accesses the CHO target cell in a manner of the conditional handover. For example, the terminal device determines that a trigger condition corresponding to a CHO candidate cell is satisfied, successfully performs the CHO, and accesses the CHO target cell in the manner of the conditional handover. Alternatively, the terminal device may successfully complete the CHO, and access the CHO target cell in a reestablishment manner. For example, the terminal device detects a connection failure, performs cell selection, and after determining that the CHO candidate cell is a target cell, successfully performs the CHO, and accesses the CHO target cell in the reestablishment manner. "A terminal device successfully completes CHO, and accesses a CHO target cell" may also be referred to as "the terminal device successfully completes the CHO, and accesses a CHO target network device". The CHO target network device is a network device to which the terminal device successfully completes CHO access.

After CHO configuration information sent by a source network device is received, whether each CHO candidate cell satisfies a handover triggering condition is determined based on the CHO configuration information, and a CHO candidate cell that satisfies the handover triggering condition is used as the target cell. Alternatively, after detecting the connection failure, the terminal device performs the cell selection, determines the CHO candidate cell as the target cell, and then performs a random access process to the determined target cell. When the random access is successfully completed, the terminal device sends an RRC message (for example, an RRC reconfiguration complete message) to a network device (namely, the CHO target network device) to which the target cell belongs, to notify the CHO target network device that the conditional handover is completed.

It may be understood that before the source network device sends the CHO configuration information to the terminal device, a preparation procedure for performing conditional handover between the source network device and at least one candidate target network device may further be included. For example, the preparation procedure may include: The source network device (for example, based on a measurement report) determines at least one candidate target cell. The source network device sends a handover request to at least one candidate target network device corresponding to the at least one candidate target cell. The at least one candidate target network device performs an admission control procedure. A candidate target network device that allows the terminal device to access sends a handover request response message to the source network device. The source network device determines the CHO configuration information based on the handover request response message.

S302: The source network device receives a handover success message sent by the CHO target network device.

After the terminal device successfully completes the CHO, and accesses the CHO target network device, the CHO target network device may send the handover success (HO SUCCESS) message to the source network device. The handover success message indicates, to the source network device, that the terminal device successfully completes the CHO, and accesses the CHO target network device.

It may be understood that, herein, the handover success message is used as an example of a message name. The name of the message indicating a handover success is not limited in this embodiment of this application.

S303: The source network device sends conditional handover (CHO) configuration information to the CHO target network device.

The CHO configuration information is terminal device-related CHO configuration information.

In a possible implementation, after the source network device sends the CHO configuration information to the CHO target network device, the source network device releases (or clears or discards) the CHO configuration information. For example, after the source network device sends the CHO configuration information to the CHO target network device, the source network device receives a terminal device context release message sent by the CHO target network device, and the source network device releases (or clears or discards) the CHO configuration information. It may be understood that, the source network device may alternatively release a part of the CHO configuration information, or release the CHO configuration information in another occasion. A manner of processing the CHO configuration information after the source network device sends the CHO configuration information to the CHO target network device is not limited in this embodiment of this application.

After receiving the CHO configuration information, the CHO target network device may store the CHO configuration information.

For example, the CHO configuration information may include CHO information that is of one or more candidate cells and that is configured by the source network device for the terminal device. The CHO information of the candidate cell may include information indicating identification information of the candidate cell and one or more corresponding handover triggering conditions (or may be referred to as execution conditions). The information indicating the identification information of the candidate cell may be a CHO configuration identifier or the CHO information of the candidate cell. The cell information may be at least one of a cell global identifier (CGI), a physical cell identifier (PCI) and frequency, a cell identifier (cell ID), a non-public network identifier (NPN ID), a non-terrestrial network identifier (NTN ID), or another cell identifier of a cell. The CGI may include a public land mobile network identifier (PLMN ID) and a cell ID. Optionally, the cell information may further include a tracking area code (TAC) and/or identification information of a network device to which the cell belongs, for example, a global network device identifier.

It may be understood that the CHO information of the candidate cell may also be referred to as a CHO mobility parameter.

Optionally, the CHO configuration information may alternatively be at least one piece of mobility information configured by the source network device for the terminal device. The mobility information may be a mobility identifier or index corresponding to the CHO mobility parameter of the cell. The mobility information may be in a form of a list, or may be in another form. This is not limited in this embodiment of this application. For example, the source network device may store a CHO mobility parameter corresponding to each cell of at least one cells, and the CHO mobility parameter of each cell corresponds to the mobility information, in other words, a CHO mobility parameter of a corresponding cell may be determined or indexed by using the mobility information. In some possible implementations, the mobility information may be a cell identifier. Alternatively, the mobility information may be an index of the CHO mobility parameter. In some possible manners, the source network device may, always or for a period of time, store the CHO mobility parameter and the corresponding mobility information of each cell, so that the corresponding CHO mobility parameter may be subsequently determined by using the mobility information. The manner can simplify indication of the CHO configuration information, reduce storage overheads of the CHO configuration information on the network device, and improve efficiency.

In another possible implementation, the conditional handover configuration information may include conditional handover information that is of one or more candidate cells and that is configured by a first network device for the terminal device and the at least one piece of mobility information configured by the source network device for the terminal device. Optionally, in this embodiment of this application, the CHO configuration information may also be referred to as CHO context information.

It may be understood that the CHO configuration information described herein is also applicable to the procedure of the embodiment shown in FIG. 2. In other words, stored CHO configuration information sent by the source network device to the CHO target network device may be the CHO information of the one or more candidate cells and/or the at least one piece of mobility information that are/is configured by the source network device for the terminal device. In addition, the CHO configuration information sent by the source network device to the terminal device may also be the foregoing described CHO configuration information. S304: The source network device obtains a mobility report.

In a possible implementation, the source network device may obtain the mobility report from a network device different from the CHO target network device. The network device different from the CHO target network device may be a third network device different from the source network device, or may be the source network device. After the source network device determines that the mobility report is a CHO-related mobility report, S305 and a subsequent step may be performed.

S305: The source network device sends a first message to the CHO target network device, to request the CHO configuration information corresponding to the terminal device.

For example, the first message may be a CHO configuration information request message. The CHO configuration information of the terminal device may be requested from the CHO target network device by using the first message. A message name and/or an information element structure of the first message are/is not limited in this embodiment of this application.

In some possible implementations, information used by the CHO target network device to determine the terminal device is carried in the first message. For example, the first message may include identification information of the terminal device, or identification information of the terminal device and CHO-related time information.

The identification information of the terminal device includes at least one of the following: a cell radio network temporary identifier (C-RNTI) of the terminal device in a source cell, a C-RNT (target C-RNTI) of a CHO target cell to which the terminal device successfully completes CHO access, an identifier (Source NG-RAN node UE XnAP ID) that is allocated by the source network device to the terminal device and that identifies the terminal device through an interface between network devices, an identifier (target NG-RAN node UE XnAP ID) that is allocated by the CHO target network device to the terminal device and that identifies the terminal device through the interface between the network devices, source cell information, and target cell information.

The CHO-related time information may indicate time information for completing CHO in the target cell by the terminal device, and/or time information of at least one message related to execution of the CHO between the source network device and the CHO target network device, for example, at least one of time information of a CHO request (handover request) sent by the source network device to the CHO target network device, time information of a CHO request acknowledgment (handover request acknowledge) message received by the source network device from the CHO target network device, time information of a handover success message received by the source network device from the CHO target network device, time information of a sequence number status transfer (sn status transfer) message sent by the source network device to the CHO target network device, or time information of a terminal device context release (UE context release) message received by the source network device from the CHO target network device. Optionally, the first message may further indicate a type of the time information, to be used by the CHO target network device to determine a message corresponding to the time information.

After receiving the identification information of the terminal device, or the identification information of the terminal device and the CHO-related time information, the CHO target network device may determine, based on the identification information of the terminal device, or the identification information of the terminal device and the CHO-related time information, whether the CHO configuration information corresponding to the terminal device is stored or can be obtained. In other words, the information may be used by the target network device to determine a correct terminal device, to determine the corresponding CHO configuration information. For example, the CHO target network device compares identification information that is of the terminal device and that is from the source network device with identification information that is of the terminal device corresponding to the CHO configuration information and that is stored in the CHO target network device. If the information is consistent, the CHO target network device determines that the CHO configuration information corresponding to the terminal device is stored or can be obtained. For another example, after the CHO target network device receives the identification information of the terminal device and the CHO-related time information that are from the source network device, the CHO target network device compares the foregoing information with identification information of the terminal device corresponding to the CHO configuration information and CHO-related time information that are stored in the CHO target network device to determine whether the information is consistent or associated. If the information is consistent or associated, the CHO target network device determines that the CHO configuration information corresponding to the terminal device is stored or can be obtained. For example, a possible case in which association exists may be that the CHO target network device determines that the received CHO-related time information and the CHO-related time information stored in the CHO target network device belong to a same range or have an overlapping range.

If it is determined that the CHO target network device stores the CHO configuration information of the terminal device, or may obtain the CHO configuration information of the terminal device in another manner, S306*a* may be performed. If the CHO target network device does not store or cannot obtain the CHO configuration information of the terminal device, step S306*b* may be performed. It may be understood that both S306*a* and S306*b* may be understood as a step in which the CHO target network device sends a response message of the first message.

S306*a*: The CHO target network device sends the CHO configuration information of the terminal device to the source network device.

Correspondingly, the source network device receives the CHO configuration information from the CHO target network device, so that the CHO configuration information may be used for mobility parameter optimization. For example, the source network device may determine, with reference to the mobility report obtained in S304, that a CHO handover triggering condition of one or more cells needs to be adjusted. It can be learned that in this embodiment of this application, the source network device can obtain the corresponding CHO configuration information, to perform proper mobility management, improve mobility robustness, and improve user experience.

In a possible implementation, the CHO target network device may send the CHO configuration information of the terminal device to the terminal device by using a CHO configuration request acknowledgment message.

S306*b*: The CHO target network device indicates a CHO configuration information request failure to the source network device.

In some possible implementations, a second message may indicate the CHO configuration information request failure to the source network device. The second message may be a CHO configuration request failure message, or may be another message. A name and an information element structure of the second message are not limited in this embodiment of this application.

Optionally, the second message may carry a failure cause. In an example, the failure cause may be "no context (no UE context)", "no CHO configuration", "invalid UE identifier (invalid UE ID)", or other information.

After receiving the second message, the source network device learns of the CHO configuration request failure, in other words, the CHO configuration information of the terminal device cannot be obtained from the CHO target network device. In this case, because the CHO configuration information that needs to be optimized cannot be determined, the source network device may discard the received mobility report, to save storage space of the terminal device.

In addition, an embodiment of this application further provides a mobility management method. In this method, considering that a CHO target network device may not receive a CHO-related mobility report of a terminal device based on a conventional procedure, a transmission path of the mobility report is further optimized. In other words, if the terminal device and the CHO target network device successfully complete CHO, regardless of whether the terminal device detects a connection failure, a network device that receives the mobility report (referred to as a receiving network device for short) sends the mobility report to the target network device that successfully completes the CHO. For example, the receiving network device may be a third network device, or may be a source network device.

Figure 4:
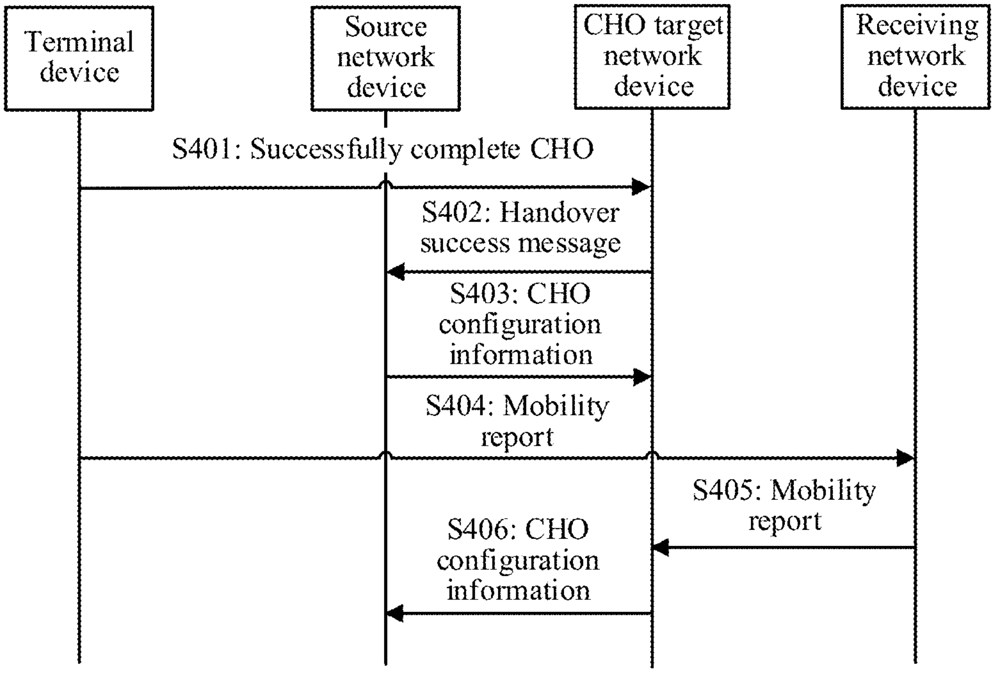
FIG. 4 is a flowchart of another example of a mobility management method according to an embodiment of this application.

In this case, as shown in FIG. 4, another embodiment of this application provides a mobility management method, and the method may include the following steps.

S401: A terminal device successfully completes CHO, and accesses a CHO target cell.

S402: A source network device receives a handover success message sent by a CHO target network device.

S403: The source network device sends CHO configuration information to the CHO target network device.

For S401 to S403, further refer to corresponding descriptions of S301 to S303 in the embodiment shown in FIG. 3. Details are not described herein again.

S404: A receiving network device receives a mobility report from the terminal device.

After receiving the mobility report sent by the terminal device, the receiving network device may identify a CHO target network device to which the terminal device successfully completes the CHO, and perform S405.

A possible scenario is that the terminal device detects a $1^{st}$ connection failure (where the $1^{st}$ connection failure may be an RLF between the terminal device and a source cell, or a HOF between the terminal device and a $1^{st}$ CHO target cell that satisfies a CHO trigger condition), selects the CHO target cell as a target cell, the terminal device successfully performs CHO reestablishment, and accesses the CHO target cell. Alternatively, another possible scenario is that the terminal device does not detect any connection failure, and the terminal device performs CHO handover, and accesses a CHO target cell that satisfies the CHO trigger condition. Optionally, the terminal device may detect no RLF between the terminal device and the CHO target cell, or may detect the RLF between the terminal device and the CHO target cell. In an implementation, the receiving network device may determine, based on at least one of CHO target cell information (for example, a failed primary cell identifier), a failure type (an RLF, where the failure type indicates that the RLF occurs after UE successfully completes CHO to a primary cell), and time information from time when CHO configuration is received to time when CHO execution is triggered (used to determine that a manner of accessing the CHO target cell by the UE is the CHO handover) in the mobility report, the CHO target network device corresponding to the CHO target cell. For another example, the receiving network device determines, based on CHO cell information, information about a cell to which the terminal device successfully completes CHO, to determine the CHO target network device corresponding to the CHO target cell. For another example, the receiving network device determines, based on a reestablishment cell identifier and a handover type (CHO) in the mobility report and "re-connected cell information" in the mobility report, that the reestablishment cell is a CHO target cell to which the terminal device successfully performs CHO reestablishment, to determine the CHO target network device corresponding to the CHO target cell. After the CHO target network device corresponding to the mobility report is determined, S405 may be performed.

S405: The receiving network device is forced to send the received mobility report to the CHO target network device.

Herein, "forced" means that the receiving network device determines, based on the mobility report, that there is the CHO target cell to which the CHO is successfully completed, and the receiving network device sends the received mobility report to the CHO target network device regardless of whether the terminal device detects a radio link failure between the terminal device and the CHO target cell.

The receiving network device herein may be the source network device, or may be a third network device.

S406: The CHO target network device sends stored CHO configuration information to the source network device.

After receiving the mobility report, the CHO target network device may send, to the source network device, the stored CHO configuration information, the CHO configuration information and the mobility report, or the CHO configuration information and analysis information that is obtained based on the mobility report.

For example, the CHO target network device may include the CHO configuration information in a HO report message sent to the source network device. A manner in which the CHO target network device sends the CHO configuration information to the source network device is not limited in this embodiment of this application.

It can be learned that, in the foregoing solution, a mechanism for forcibly forwarding the mobility report between the receiving network device and the CHO target network device is introduced, so that the mobility report needs to be forwarded by the receiving network device to the CHO target network device. In this way, the CHO target network device may have an opportunity to send the CHO configuration information to the source network device, so that the source network device may obtain corresponding CHO configuration information. In this way, proper mobility management is performed, mobility robustness is improved, and user experience is improved.

In another possible implementation, the receiving network device may send the mobility report to a CHO target network device that has a 2nd connection failure and whose connection failure type is an RLF. A possible scenario is that the terminal device detects the 1st connection failure (where the 1st connection failure may be the RLF between the terminal device and the source cell, or the HOF between the terminal device and the 1st CHO target cell that satisfies the CHO trigger condition), performs cell selection, selects the CHO target cell as the target cell, and after the terminal device successfully performs the CHO reestablishment, the terminal device detects the radio link failure between the terminal device and the CHO target cell. In other words, in S404, the receiving network device determines, based on information in the mobility report, that the terminal device detects two connection failures, where the 1st connection failure is the RLF between the terminal device and the source cell or the HOF between the terminal device and the 1st CHO target cell that satisfies the CHO trigger condition, and the $2^{nd}$ connection failure is the RLF between the terminal device and the CHO target cell determined by using the cell selection. The receiving network device determines to send the mobility report to the CHO target network device to which a CHO target cell belongs and that corresponds to the $2^{nd}$ connection failure. In this case, S405 may be replaced with: The receiving network device sends the mobility report to the CHO target network device to which the CHO target cell belongs and that corresponds to the $2^{nd}$ connection failure.

Optionally, in another possible implementation, in consideration of a cross-system or cross-standard mobility scenario, if the mobility report generated by the terminal device is in an encoding format of a first system/standard, the terminal device sends the mobility report to the receiving network device in a cell in a second system/standard, and the terminal device may send the mobility report to the receiving network device in a manner of a container. To assist the receiving network device in better forwarding the mobility report, the terminal device may further indicate, outside the container, information of destination cell (a forward cell for short) information of the forwarding. The forward cell may be at least one of the source cell, the CHO target cell to which the CHO is successfully completed, the CHO target cell that detects the $2^{nd}$ connection failure and whose connection failure type is the RLF, or a target cell that successfully completes CHO handover but detects an RLF. It may be understood that, if there are two or more forward cells, the terminal device may further indicate a priority sequence of the cells forwarding the mobility report. For example, when the terminal device detects the RLF between the terminal device and the source cell and successfully completes the CHO to the CHO target cell, the terminal device may indicate the receiving network device to first forward the mobility report to the CHO target network device to which the CHO target cell belongs. In this way, the mobility report may be forwarded to the CHO target network device. The CHO target network device may determine the CHO configuration information of the terminal device based on identification information of the terminal device in the mobility report, or identification information of the terminal device and CHO-related time information in the mobility report. The CHO target network device may send the CHO configuration information, and the mobility report or the analysis information based on the mobility report to the source network device, so that the source network device can optimize the CHO configuration information based on the mobility report or the analysis information based on the mobility report, to improve robustness of subsequent mobility management. It may be understood that the mechanism for sending the mobility report in the cross-system or cross-standard mobility scenario described in this paragraph is applicable to the procedure in the embodiment shown in FIG. 4, or is applicable to another procedure, for example, the procedure shown in FIG. 2 or FIG. 3 or another procedure related to forwarding of a mobility report in a conventional technology. This is not limited in this embodiment of this application.

In a mobility management method according to another embodiment of this application, a mechanism for a source network device to store CHO configuration information is provided.

Manner 1

If the source network device determines that HANDOVER SUCCESS sent by a CHO target network device is not received, or if the source network device determines that indication information indicating that a mobility report is stored on a terminal device side is received from the CHO target network device, the source network device stores the CHO configuration information, in other words, the source network device does not release the CHO configuration information or does not release the CHO configuration information temporarily, for example, the source network device may store the CHO configuration information for a period of time, for example, 48 hours.

It may be understood that, before the source network device determines that HANDOVER SUCCESS sent by the CHO target network device is not received, or the source network device determines that the indication information indicating that the mobility report is stored on the terminal device side is received from the CHO target network device, a preparation procedure for performing conditional handover between the source network device and at least one candidate target network device is further included. The source network device sends the CHO configuration information to the terminal device. The terminal device successfully completes CHO, and accesses a CHO target cell based on the CHO configuration information.

Manner 2

In another possible implementation, after the terminal device and the CHO target network device successfully complete CHO, the CHO target network device may start a first timer. Within running time of the first timer, if the CHO target network device detects a connection failure (where for example, the CHO target network device cannot receive feedback information of downlink data of the scheduled terminal device, or receives failure indication information that is sent by another network device and that indicates the terminal device to perform another manner such as reestablishment on the another network device) between the terminal device and the CHO target cell (that is, a current serving cell), the CHO target network device sends indication information to the source network device, to indicate the source network device to store the CHO configuration information of the terminal device, in other words, the source network device does not release the CHO configuration information, or does not release the CHO configuration information temporarily.

Alternatively, within running time of the first timer, if the CHO target network device detects the connection failure between the terminal device and the CHO target cell, and the CHO target network device does not send a HANDOVER SUCCESS message or a UE Context Release message to the source network device, the source network device considers that CHO fails, and the source network device stores the CHO configuration information of the terminal device, in other words, the source network device does not release the CHO configuration information or does not release the CHO configuration information temporarily. Optionally, if the first timer expires and the CHO target network device detects no connection failure between the terminal device and the CHO target network device, the CHO target network device may send the HANDOVER SUCCESS message or the UE Context Release message to the source network device. After receiving UE Context Release, the source network device releases the CHO configuration information of the terminal device. Optionally, if a failure between the terminal device and the serving cell is detected within the running time of the first timer, the CHO target network device stops the first timer.

Manner 3

In another possible implementation, after the source network device receives the HANDOVER SUCCESS message from the CHO target network device, the source network device starts a second timer. If the second timer expires, and the source network device does not receive the UE Context Release message from the CHO target network device, the source network device stores the CHO configuration information of the terminal device, in other words, the source network device does not release the CHO configuration information or does not release the CHO configuration information temporarily. Alternatively, within running time of the second timer, if the source network device receives the indication information that is from the CHO target network device and that indicates that the mobility report is stored on the terminal device side, or the source network device receives indication information that is from the CHO target network device and that indicates the connection failure between the terminal device and the CHO target network device, the source network device stores the CHO configuration information of the terminal device, in other words, the source network device does not release the CHO configuration information or does not release the CHO configuration information temporarily. Optionally, within the running time of the second timer, if the source network device receives the indication information that is from the CHO target network device and that indicates that the mobility report is stored on the terminal device side, or the source network device receives the indication information that is from the CHO target network device and that indicates the connection failure between the terminal device and the CHO target network device, the source network device may stop the second timer.

Manner 4

In another possible implementation, after the source network device receives the UE Context Release message sent by the CHO target network device, the source network device starts a third timer. Within running time of the third timer, if the source network device receives the indication information that is from the CHO target network device and that indicates that the mobility report is stored on the terminal device side, or the source network device receives the indication information that is from the CHO target network device and that indicates the connection failure between the terminal device and the CHO target network device, the source network device stores the CHO configuration information of the terminal device, in other words, the source network device does not release the CHO configuration information, or does not release the CHO configuration information temporarily. Optionally, within the running time of the third timer, if the source network device receives the indication information that is from the CHO target network device and that indicates that the mobility report is stored on the terminal device side, or the source network device receives the indication information that is from the CHO target network device and that indicates the connection failure between the terminal device and the CHO target network device, the source network device may stop the third timer.

It may be understood that running duration of the first timer, the second timer, and the third timer may be configured by a network device, or may be predefined in a protocol. It may be understood that the first timer, the second timer, and the third timer may have a same configuration manner or different configuration manners. Optionally, the running duration of the first timer, the second timer, and the third timer may be the same or different. This is not limited in this embodiment of this application. In addition, Manner 3 or Manner 4 may alternatively be implemented in combination with Manner 1 or Manner 2.

It may be understood that, by using at least one of the foregoing implementations of Manner 1 to Manner 4, the network device may store CHO configuration information only in a scenario in which a connection failure or a potential connection failure occurs in a mobility process, to reduce storage overheads of the network device.

Figure 5:
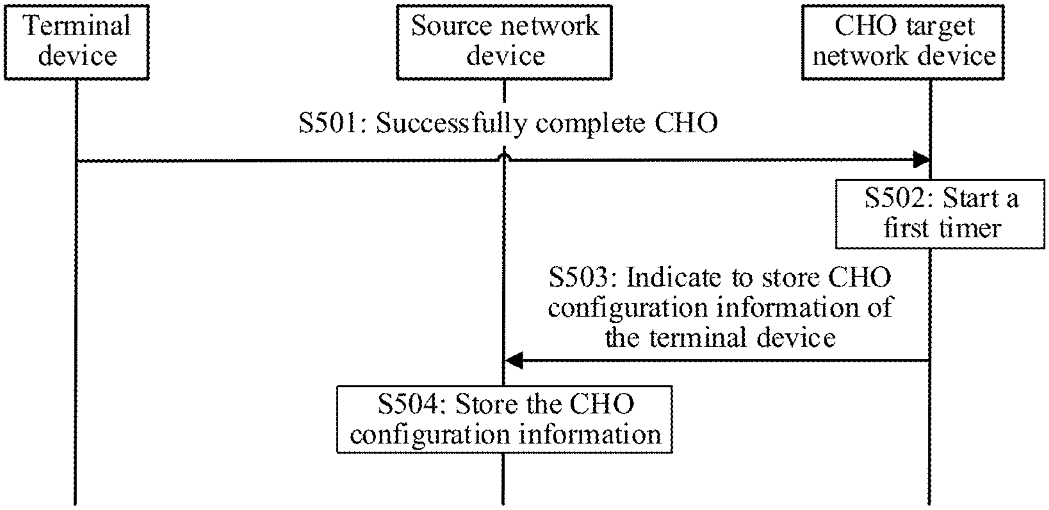
FIG. 5 is a flowchart of another example of a mobility management method according to an embodiment of this application.

It should be noted that the mechanism for the source network device to store the CHO configuration information may be implemented with reference to the embodiments shown in FIG. 2 to FIG. 4, or may be implemented through another procedure. Manner 2 is used as an example. A possible procedure may be shown in FIG. 5, and includes the following steps.

S501: A terminal device successfully completes CHO, and accesses a CHO target cell.

For S501, refer to the descriptions of S301. Details are not described herein again.

S502: A CHO target network device starts a first timer.

S503: The CHO target network device sends indication information to a source network device, to indicate the source network device to store CHO configuration information of the terminal device.

Optionally, the CHO target network device detects a connection failure between the terminal device and the CHO target cell within running time of the first timer, and therefore performs S503.

The indication information may explicitly indicate whether to store the CHO configuration information of the terminal device, or may implicitly indicate that the CHO target network device detects a connection failure between the terminal device and the CHO target cell within the running time of the first timer, so that the source network device determines, based on the indication information, to store the CHO configuration information.

S504: The source network device stores the CHO configuration information.

In other words, after receiving the indication information, the source network device does not release the CHO configuration information, or does not release the CHO configuration information temporarily.

Optionally, the source network device may further perform mobility management based on a mobility report and the stored CHO configuration information.

The mobility report may be received by the source network device from the terminal device, another network device, or a core network device. This is not limited in this embodiment of this application.

The source network device may determine, based on the stored CHO configuration information, whether subsequent CHO configuration needs to be adjusted, to perform proper mobility management, improve mobility robustness, and improve user experience.

It may be understood that, application of a corresponding mobility management method procedure based on the mechanism provided in the foregoing manner may have different changes or adjustments. A mobility management method procedure in another manner is not described by using examples one by one in this embodiment of this application.

It should be noted that, in the embodiments shown in FIG. 2 to FIG. 5, interaction between network devices may be direct interaction or indirect interaction. In other words, interaction between the source network device, CHO target network device and a third network device may be completed directly (for example, through an interface between base stations, for example, an X2 or Xn interface) or indirectly (for example, through an interface between the base station and the core network device, for example, an S1 or NG interface). Message names may be different in different interface transmission cases. This is not limited in this embodiment of this application.

The method procedure shown in FIG. 3 is used as an example. FIG. 3 is described by using an example in which network devices may interact with each other. In a scenario in which there is no interface between the source network device and the CHO target network device, the source network device may send a message or information to the CHO target network device via the core network device. For example, the source network device sends a first message to the core network device through an interface between the source network device and the core network device. For example, the source network device sends the first message to the core network device through the S1 or NG interface, and the core network device forwards, to the CHO target network device, the first message received from the source network device or content in the first message. In some possible implementations, the source network device may send the first message or the content in the first message to the CHO target network device through the S1/NG interface by using one of the following messages: a CHO configuration request message, an uplink RAN configuration transmission (UPLINK RAN CONFIGURATION TRANSFER) message, a base station configuration transmission (eNB CONFIGURATION TRANSFER) message, or another message. Correspondingly, the CHO target network device may send a response message to the core network device by using one of the following messages: a CHO configuration request acknowledgment message, a CHO configuration request failure message, an uplink RAN configuration transmission (UPLINK RAN CONFIGURATION TRANSFER) message, a base station configuration transmission (eNB CONFIGURATION TRANSFER) message, or another message. Further, the source network device may receive the response message from the CHO target network device through the S1/NG/N2 interface by using one of the following messages: a CHO configuration request acknowledgment message, a CHO configuration request failure message, a downlink RAN configuration transmission (DOWNLINK RAN CONFIGURATION TRANSFER) message, a core network device configuration transmission (MME CONFIGURATION TRANSFER) message, or another message. In addition, the source network device and the target network device may be connected to a same core network device, or may be connected to different core network devices. Optionally, core network devices connected to the source network device and the target network device may belong to a same standard, or may belong to different standards. For example, a core network device connected to the source network device is an AMF (access and mobility management function, access mobility management function), and a core network device connected to the target network device may be an MME (mobility management entity).

It should be noted that, the source network device in the foregoing embodiments may also be referred to as a first network device, and the CHO target network device may be referred to as a second network device.

With reference to the accompanying drawings, the following describes apparatuses configured to implement the foregoing methods in embodiments of this application. Therefore, all the foregoing content may be used in the following embodiments. Repeated content is not described again. To implement functions in the methods provided in the foregoing embodiments of this application, each network element or apparatus may include a hardware structure and/or a software module, and implement the foregoing functions in a form of the hardware structure, the software module, or a combination of the hardware structure and the software module.

Figure 6:
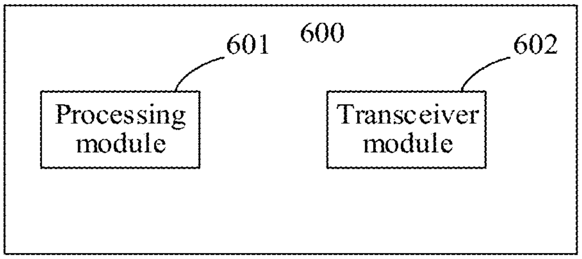
FIG. 6 is a schematic diagram of a communication apparatus according to an embodiment of this application.

FIG. 6 is a schematic block diagram of a communication apparatus 600 according to an embodiment of this application. The communication apparatus 600 may correspondingly implement functions or steps implemented by the terminal device, the source network device, the CHO target network device, or the receiving network device in the method embodiments shown in FIG. 2 to FIG. 5. The communication apparatus 600 may be a network device or a component (for example, a chip or a circuit) applicable to a network device, or the communication apparatus 600 may be a chip system. In this embodiment of this application, the chip system may include a chip, or may include a chip and a discrete device.

As shown in FIG. 6, the communication apparatus 600 includes a transceiver module 601 and a processing module 602. Optionally, the communication apparatus may further include a storage module. The storage module may be configured to store one or more of data, information, and instructions.

In some examples, the communication apparatus 600 is configured to implement the function of the foregoing source network device.

In a possible implementation, the transceiver module 601 is configured to send CHO configuration information of a terminal device to a second network device. Optionally, the processing module 602 may release the CHO configuration information after the transceiver module 601 sends the CHO configuration information of the terminal device to the second network device. Further, after the communication apparatus 600 obtains a mobility report, the transceiver module 601 sends a first message to the second network device, to request the CHO configuration information of the terminal device, and receives a response message of the first message from the second network device. Optionally, the transceiver module 601 may be further configured to receive a handover success message from the second network device, before sending the CHO configuration information of the terminal device to the second network device, and after the terminal device successfully completes conditional handover, and accesses the second network device.

In another possible implementation, the processing module 602 determines that HANDOVER SUCCESS sent by the second network device is not received, or the processing module 602 determines that the transceiver module 601 receives indication information that is sent by the second network device and that indicates that the mobility report is stored on the terminal device side, and the processing module 602 triggers storing of the CHO configuration information of the terminal device. The processing module 602 may store the CHO configuration information, or the processing module 602 may notify or indicate the storage module to store the CHO configuration information.

In another possible implementation, the transceiver module 601 is configured to receive indication information from the second network device, where the indication information indicates to store the CHO configuration information of the terminal device. If the indication information is sent when the second network device detects a connection failure between the terminal device and a CHO target cell within running time of a first timer, the processing module 602 triggers storing of the CHO configuration information of the terminal device.

In another possible implementation, the processing module 602 is configured to: determine a CHO failure of the terminal device, and trigger the storing of the CHO configuration information of the terminal device. The processing module 602 may determine the CHO failure when determining that the transceiver module 601 does not receive the HANDOVER SUCCESS message or a UE Context Release message.

In another possible implementation, the transceiver module 601 is configured to receive the handover success message from the second network device, and the processing module 602 starts a second timer after the transceiver module 601 receives the handover success message. If the second timer expires, and the transceiver module 601 does not receive the UE Context Release message from the second network device, the processing module 602 triggers the storing of the CHO configuration information of the terminal device. Alternatively, within running time of the second timer, if the transceiver module 601 receives indication information that is from the second network device and that indicates that the mobility report is stored on the terminal device side, or the transceiver module 601 receives indication information that is from the second network device and that indicates a connection failure between the terminal device and the second network device, the processing module 602 triggers the storing of the CHO configuration information of the terminal device. Optionally, within the running time of the second timer, if the transceiver module 601 receives the indication information that is from the second network device and that indicates that the mobility report is stored on the terminal device side, or the transceiver module 601 receives the indication information that is from the second network device and that indicates the connection failure between the terminal device and the second network device, the processing module 602 may stop the second timer.

In another possible implementation, the transceiver module 601 is configured to receive the UE Context Release message sent by the second network device, and the processing module 602 starts a third timer after the transceiver module 601 receives the UE Context Release message. Within running time of the third timer, if the transceiver module 601 receives the indication information that is from the second network device and that indicates that the mobility report is stored on the terminal device side, or the transceiver module 601 receives the indication information that is from the second network device and that indicates the connection failure between the terminal device and the second network device, the processing module 602 triggers the storing of the CHO configuration information of the terminal device. Optionally, within the running time of the third timer, if the transceiver module 601 receives the indication information that is from the second network device and that indicates that the mobility report is stored on the terminal device side, or the transceiver module 601 receives the indication information that is from the second network device and that indicates the connection failure between the terminal device and the second network device, the processing module 602 may stop the third timer.

In some other examples, the communication apparatus 600 is configured to implement the function of the foregoing CHO target network device.

In a possible implementation, the transceiver module 601 is configured to: receive conditional handover configuration information of a terminal device from a first network device, receive a first message from the first network device, and send a response message of the first message to the first network device. The processing module 602 may be configured to determine whether the communication apparatus 600 stores the CHO configuration information of the terminal device, or whether the CHO configuration information of the terminal device may be obtained in another manner. In this way, the transceiver module 601 may send different response messages based on a determining result of the processing module 602.

In another possible implementation, the processing module 602 starts a first timer after the terminal device successfully completes CHO. If the processing module 602 determines that a connection failure between the terminal device and a serving cell is detected within running time of the first timer, the transceiver module 601 is configured to send, to the first network device, information indicating the first network device to store the CHO configuration information. Alternatively, if the processing module 602 determines that the connection failure between the terminal device and the serving cell is detected within running time of the first timer, the transceiver module 601 does not send a HANDOVER SUCCESS message or a UE Context Release message to the first network device. Optionally, if the first timer expires, and no connection failure between the terminal device and a CHO target cell is detected, the transceiver module 601 may send the HANDOVER SUCCESS message or the UE Context Release message to the first network device.

In some other examples, the communication apparatus 600 is configured to implement the function of the foregoing receiving network device.

In a possible implementation, the transceiver module 601 is configured to receive a mobility report from a terminal device.

Optionally, the processing module 602 may identify, based on the received mobility report, a CHO target network device to which the terminal device successfully completes CHO, and force the transceiver module 601 to send the received mobility report to the CHO target network device.

Alternatively, the processing module 602 may trigger sending of the mobility report to a CHO target network device that has a 2nd connection failure and whose connection failure type is an RLF.

In another possible implementation, the transceiver module 601 is configured to receive, from the terminal device, the mobility report and information indicating a forward cell, where the mobility report is in an encoding format of a first system or standard, and when the mobility report is received, a cell in which the terminal device is located belongs to a second system or standard. Optionally, the transceiver module 601 may further receive, from the terminal device, information indicating a priority sequence of forward cells. The processing module 602 forwards the mobility report based on the information received by the transceiver module 601.

In some other examples, the communication apparatus 600 is configured to implement the function of the foregoing terminal device.

In a possible implementation, the transceiver module 601 is configured to send, to a receiving network device, a mobility report and information indicating forward cell information, where the mobility report is in an encoding format of a first system or standard, and when the mobility report is sent, a cell in which the terminal device is located belongs to a second system or standard. Optionally, the transceiver module 601 may further indicate, to the receiving network device, information about a priority sequence of forward cells.

In another possible implementation, the transceiver module 601 is configured to receive, from the source network device, the CHO configuration information described in S303.

It may be understood that, for coupling between modules of the communication apparatus 600 and specific implementation of the modules, refer to descriptions in the method embodiment. Details are not described herein again.

It should be understood that in this embodiment of this application, the processing module 602 may be implemented by at least one processor or a processor-related circuit component, and the transceiver module 601 may be implemented by a transceiver, a transceiver-related circuit component, or a communication interface. The storage module may be implemented by at least one memory. In addition, the foregoing modules may be separated or integrated. This is not limited in this embodiment of this application.

Figure 7:
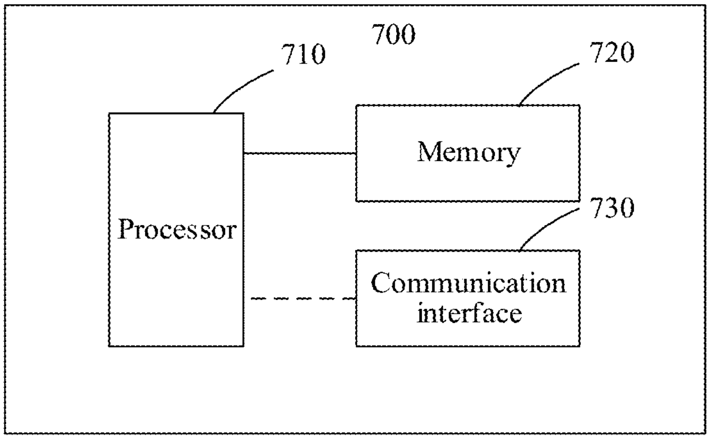
FIG. 7 is a schematic diagram of another communication apparatus according to an embodiment of this application.

As shown in FIG. 7, an embodiment of this application further provides a communication apparatus 700, which may be configured to implement or support the communication apparatus 700 in implementing functions of a network device or a terminal device in the methods provided in embodiments of this application. The communication apparatus 700 includes at least one processor 710 and at least one memory 720, and is configured to store program instructions, data and/or information. The memory 720 is coupled to the processor 710. Coupling in this embodiment of this application may be an indirect coupling or a communication connection between apparatuses, units, or modules in an electrical form, a mechanical form, or another form, and is used for information exchange between the apparatuses, the units, or the modules. The processor 710 may cooperate with the memory 720. The processor 710 may read the program instructions, the data and/or the information stored in the memory 720, so that the communication apparatus 700 implements a corresponding method. Optionally, at least one of the at least one memory may be included in the processor.

The communication apparatus 700 may further include a communication interface 730, configured to communicate with another device via a transmission medium, so that an apparatus used in the communication apparatus 700 may communicate with the another device.

In this embodiment of this application, a specific connection medium between the communication interface 730, the processor 710, and the memory 720 is not limited. For example, in this embodiment of this application, the memory 720, the processor 710, and the communication interface 730 are connected through a bus in FIG. 7. This is merely an example for description, and is not limited thereto. The bus may be classified into an address bus, a data bus, a control bus, and the like.

In this embodiment of this application, the processor may be a general-purpose processor, a digital signal processor, an application-specific integrated circuit, a field programmable gate array or another programmable logic device, a discrete gate or transistor logic device, or a discrete hardware component, and may implement or perform the methods, the steps, and the logical block diagrams disclosed in embodiments of this application. The general-purpose processor may be a microprocessor or any conventional processor or the like. The steps in the method disclosed with reference to embodiments of this application may be directly performed by a hardware processor, or may be performed by using a combination of hardware in the processor and a software module.

In this embodiment of this application, the memory may be a nonvolatile memory such as a hard disk drive (HDD) or a solid-state drive (SSD), or may be a volatile memory such as a random access memory (RAM). The memory is any other medium that can carry or store expected program code in a form of instructions or a data structure and that can be accessed by a computer, but is not limited thereto. The memory in this embodiment of this application may alternatively be a circuit or any other apparatus that can implement a storage function, and is configured to store the program instructions and/or the data.

An embodiment of this application further provides a communication system, configured to implement all or some of the steps in the foregoing method embodiments. For example, the communication system may include one or more of the foregoing first network device, the second network device, the receiving network device, and the terminal device.

An embodiment of this application further provides a computer-readable storage medium, including instructions. When the computer-readable storage medium is run on a computer, the method performed by the terminal device in the embodiments shown in FIG. 2 to FIG. 5 is performed.

An embodiment of this application further provides a computer-readable storage medium, including instructions. When the computer-readable storage medium is run on a computer, the method performed by the network device in the embodiments shown in FIG. 2 to FIG. 5 is performed. The network device herein may be one of a first network device, a second network device, or a receiving network device.

An embodiment of this application further provides a computer program product, including instructions. When the computer program product runs on a computer, the method performed by the network device or the terminal device in the embodiments shown in FIG. 2 to FIG. 5 is performed.

Division into the modules in embodiments of this application is an example, is merely division into logical functions, and may be other division during actual implementation. In addition, functional modules in embodiments of this application may be integrated into one processor, or each of the modules may exist alone physically, or two or more modules may be integrated into one module. The integrated module may be implemented in a form of hardware, or may be implemented in a form of a software functional module. The module may also be referred to as a unit.

All or some of the methods provided in embodiments of this application may be implemented by using software, hardware, firmware, or any combination thereof. When the software is used to implement the methods, all or some of the methods may be implemented in a form of a computer program product. The computer program product includes one or more computer instructions. When the computer program instructions are loaded and executed on a computer, all or some of the procedures or functions in embodiments of the present invention are generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL for short)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a digital video disc (DVD for short)), a semiconductor medium (for example, an SSD), or the like.

It is clear that, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A mobility management method, comprising:

receiving, by a first network device, a conditional handover success message from a second network device, wherein the second network device is a network device of a target cell, and the target cell belongs to a conditional handover candidate cell configured by the first network device for a terminal device; and after receiving the conditional handover success message sending, by the first network device, conditional handover configuration information to the second network device, wherein the conditional handover configuration information indicates identification information of the conditional handover candidate cell and one or more corresponding handover triggering conditions.

2. The method according to claim 1, wherein the method further comprises:

releasing, by the first network device, the conditional handover configuration information.

3. The method according to claim 1, wherein the method further comprises:

receiving, by the first network device, the conditional handover configuration information from the second network device.

4. The method according to claim 3, wherein the method further comprises:

receiving, by the first network device, a mobility report from the second network device, wherein the mobility report is from the terminal device.

5. The method according to claim 3, wherein the method further comprises:

receiving, by the first network device from the second network device, analysis information obtained based on a mobility report, wherein the mobility report is from the terminal device.

6. The method according to claim 1, wherein in response to the terminal device detecting a radio link failure or no radio link failure between the terminal device and the conditional handover candidate cell, the first network device receives the conditional handover configuration information from the second network device.

7. The method according to claim 1, wherein the conditional handover configuration information comprises conditional handover information that is of one or more candidate cells.

8. A mobility management method, comprising:

sending, by a second network device, a conditional handover success message to a first network device, wherein the second network device is a network device of a target cell, and the target cell belongs to a conditional handover candidate cell configured by the first network device for a terminal device; and after sending the conditional handover success message, receiving, by the second network device, conditional handover configuration information of the terminal device from the first network device, wherein the conditional handover configuration information indicates identification information of the conditional handover candidate cell and one or more corresponding handover triggering conditions.

9. The method according to claim 8, wherein the method further comprises:

receiving, by the second network device, a mobility report of the terminal device from a receiving network device, wherein the receiving network device is a network device that receives the mobility report from the terminal device.

10. The method according to claim 8, wherein the method further comprises:

sending, by the second network device, the conditional handover configuration information to the first network device.

11. The method according to claim 9, wherein the method further comprises:

sending, by the second network device, the mobility report to the first network device.

12. The method according to claim 8, wherein in response to the terminal device detecting a radio link failure or no radio link failure between the terminal device and the conditional handover candidate cell, the second network device sends the conditional handover configuration information to the first network device.

13. The method according to claim 8, wherein the conditional handover configuration information comprises conditional handover information that is of one or more candidate cells.

14. A communication system, comprising:

a first network device; and a second network device, wherein the first network device is configured to receive a conditional handover success message from the second network device and after receiving the conditional handover success message, send conditional handover configuration information to the second network device, wherein the conditional handover configuration information indicates identification information of a conditional handover candidate cell and one or more corresponding handover triggering conditions, wherein the second network device is a network device of a target cell, and wherein the target cell belongs to the conditional handover candidate cell configured by the first network device for a terminal device.

15. The system according to claim 14, wherein the first network device is further configured to release the conditional handover configuration information.

16. The system according to claim 14, wherein the first network device is further configured to receive the conditional handover configuration information from the second network device.

17. The system according to claim 16, wherein the first network device is further configured to receive a mobility report from the second network device, and wherein the mobility report is from the terminal device.

18. The system according to claim 14, wherein in response to the terminal device detecting a radio link failure or no radio link failure between the terminal device and the conditional handover candidate cell, the second network device is configured to send the conditional handover configuration information to the first network device.

19. The system according to claim 14, wherein the first network device is configured to receive, from the second network device, analysis information obtained based on a mobility report, and wherein the mobility report is from the terminal device.

20. The system according to claim 14, wherein the conditional handover configuration information comprises conditional handover information that is of one or more candidate cells.

* * * * *